United States Patent
Vann et al.

(10) Patent No.: US 11,193,520 B2
(45) Date of Patent: Dec. 7, 2021

(54) FASTENER ASSEMBLY FOR USE WITH ONE OR MORE WORKPIECES

(71) Applicant: GM GLOBAL TECHNOLOGY OPERATIONS LLC, Detroit, MI (US)

(72) Inventors: Mark O. Vann, Canton, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 840 days.

(21) Appl. No.: 15/955,167

(22) Filed: Apr. 17, 2018

(65) Prior Publication Data

US 2019/0316622 A1   Oct. 17, 2019

(51) Int. Cl.
| F16B 13/04 | (2006.01) |
| F16B 19/10 | (2006.01) |
| F16B 5/04  | (2006.01) |
| B21J 15/02 | (2006.01) |
| F16B 19/04 | (2006.01) |

(52) U.S. Cl.
CPC ............ F16B 19/1063 (2013.01); F16B 5/04 (2013.01); B21J 15/027 (2013.01); *F16B 2019/045* (2013.01)

(58) Field of Classification Search
USPC .......................................................... 411/29
See application file for complete search history.

(56) References Cited

U.S. PATENT DOCUMENTS

| 5,762,456 A * | 6/1998 | Aasgaard | F16B 13/04 411/107 |
| 7,862,271 B2 | 1/2011 | Wang et al. | |
| 7,880,112 B2 * | 2/2011 | Hengel | B23K 11/004 219/93 |
| 8,266,779 B2 * | 9/2012 | Gillis | F16B 13/002 29/432 |
| 8,721,241 B2 * | 5/2014 | Jokisch | F16B 5/04 411/29 |
| 2006/0175381 A1 * | 8/2006 | Wang | F16B 29/00 228/112.1 |
| 2006/0236739 A1 * | 10/2006 | Smith | B21C 37/298 72/67 |
| 2011/0164845 A1 * | 7/2011 | Jenkins | G02B 6/3596 385/18 |
| 2015/0143686 A1 * | 5/2015 | Blacket | B21J 15/26 29/525.06 |
| 2016/0084290 A1 * | 3/2016 | Chung | F16B 19/083 29/525.06 |
| 2016/0091009 A1 * | 3/2016 | Wang | B21J 15/027 29/524.1 |
| 2018/0154426 A1 * | 6/2018 | Xiao | B21J 15/043 |
| 2018/0214934 A1 * | 8/2018 | Wang | F16B 19/1054 |
| 2019/0022737 A1 * | 1/2019 | Ma | B21J 15/027 |

* cited by examiner

Primary Examiner — Gary W Estremsky (74) Attorney, Agent, or Firm — Vivacqua Crane, PLLC (57) ABSTRACT

A fastener assembly for use with one or more workpieces. The fastener assembly can be a single-sided (i.e., blind) fastener assembly in which the fastener assembly is inaccessible from one side of the workpiece(s). In this regard, the workpiece(s) can make-up an enclosed component, for example. The fastener assembly can have a fastening end, such as a threaded stud, for securement with a distinct component that is otherwise detached from the fastener assembly. The workpiece(s) can be composed of a carbon fiber composite material, an aluminum material, or another type of material.

12 Claims, 4 Drawing Sheets

FASTENER ASSEMBLY FOR USE WITH ONE OR MORE WORKPIECES

INTRODUCTION

The present disclosure relates generally to fastener assemblies for securing components to workpieces.

Fastener assemblies are sometimes mounted to one or more workpieces and typically have an end that can be secured with another additional component. In this way, the components are secured to the workpiece(s) via the fastener assemblies. The ends of the fastener assemblies can be studs or some other kind of fastening end to enable securement with the additional components.

Products of manufacture—and hence the workpieces they are made of—are increasingly incorporating lighter weight materials like aluminum, magnesium, and polymer composite materials into their construction. Sometimes the products of manufacture have an enclosed structure, such as a box or tubing, making the associated fastener assemblies inaccessible from an interior of the enclosed structure and only accessible from an exterior of the enclosed structure (often termed single-sided or blind fastener assemblies). These kinds of applications present unique challenges with the use of fastener assemblies.

SUMMARY

In an embodiment, a fastener assembly is used to join a workpiece stack-up. The fastener assembly may include a body, a mandrel, an interconnection, and an interference structure. The body has a sleeve and a bore spanning through the sleeve. The mandrel is disposed in the bore. The mandrel has a working end and a fastening end. The working end projects out of a first open end of the bore, and the fastening end projects out of a second open end of the bore. The fastening end is used for securement with a distinct component. The interconnection is between the body and the mandrel, and unites rotation of the body with rotation of the mandrel. The interference structure resides near the second open end of the bore. Amid use of the fastener assembly, the working end of the mandrel is used to soften the materials of the workpiece stack-up via the generation of friction as the fastener assembly is being urged through the workpiece stack-up. In installation of the fastener assembly in the workpiece stack-up, a section of the sleeve and a section of the working end are exposed at an underside of the workpiece stack-up. The working end is upset into the sleeve to thereby fix outboard movement of the fastener assembly at the underside of the workpiece stack-up. The fastening end remains exposed at a topside of the workpiece stack-up with the interference structure partly or more exposed at the topside. The interference structure fixes inboard movement of the fastener assembly at the topside of the workpiece stack-up.

In an embodiment, the fastening end is a stud having a set of external threads for securement with the distinct component. Or, the fastening end is a nut having a set of internal threads for securement with the distinct component.

In an embodiment, the interference structure is a collar situated on the mandrel at the fastening end. In installation of the fastener assembly in the workpiece stack-up, the collar remains exposed at the topside of the workpiece stack-up.

In an embodiment, the collar is a separate component than the body and is a separate component than the mandrel.

In an embodiment, in installation of the fastener assembly in the workpiece stack-up, the collar has a swaged-interference engagement with the mandrel at the fastening end. The swaged-interference engagement fixes inboard movement of the fastener assembly at the topside of the workpiece stack-up.

In an embodiment, the fastening end is a stud having a set of external threads. The swaged-interference engagement of the collar is had with the set of external threads of the stud.

In an embodiment, the working end has a cavity. During use of the fastener assembly, the cavity is used to capture a slug of material of the workpiece stack-up that is displaced from the workpiece stack-up amid installation procedures of the fastener assembly in the workpiece stack-up.

In an embodiment, the slug of material of the workpiece stack-up remains captured within the cavity of the working end when the working end is upset into the sleeve.

In an embodiment, the fastener assembly is a blind fastener assembly in which access to the fastener assembly at the underside of the workpiece stack-up is precluded.

In an embodiment, a fastener assembly is used to join a workpiece stack-up. The fastener assembly may include a body and a mandrel. The body has a sleeve and a bore spanning through the sleeve. The mandrel is disposed in the bore and has a working end. The working end projects out of an open end of the bore and has a cavity therein. Amid use of the fastener assembly, the working end of the mandrel is used to soften the materials of the workpiece stack-up via the generation of friction. The cavity is used to capture a slug of material of the workpiece stack-up that is displaced from the workpiece stack-up as the fastener assembly is being urged through the workpiece stack-up. In installation of the fastener assembly in the workpiece stack-up, a section of the sleeve and a section of the working end are exposed at an underside of the workpiece stack-up. The working end is upset into the sleeve to thereby fix outboard movement of the fastener assembly at the underside of the workpiece stack-up.

In an embodiment, the slug of material of the workpiece stack-up remains captured within the cavity of the working end when the working end is upset into the sleeve.

In an embodiment, the working end has a closed end and an open end. The cavity spans between the closed end and the open end. The open end constitutes the inboard-most-extending end of the working end that comes into initial contact with a topside surface of the workpiece stack-up as the fastener assembly is being urged through the workpiece stack-up.

In an embodiment, the cavity is defined in part or more by an inside surface of the working end. A retention structure resides at the inside surface. The retention structure engages the slug of material of the workpiece stack-up and retains capture of the slug of material within the cavity.

In an embodiment, the fastener assembly is a blind fastener assembly in which access to the fastener assembly at the underside of the workpiece stack-up is precluded.

In an embodiment, a fastener assembly is for mounting to one or more workpieces. The fastener assembly may include a fastener body, a nut, and an adhesive coating. The fastener body has a head and a stud. The head has one or more lugs extending laterally from it. The stud extends longitudinally from the head. The stud has a set of external threads. The nut has a set of internal threads that can tighten over the set of external threads of the stud. The adhesive coating resides on one or more of the following surfaces: a surface of the head, a surface of the lug(s), and/or a surface of the nut. Amid use of the fastener assembly, the fastener body is inserted through a cutout in the workpiece(s). The cutout resembles a peripheral profile of the head and of the lug(s). The fastener body is turned about a longitudinal axis of the stud, the nut is tightened over the stud, and the adhesive coating is cured.

In an embodiment, the fastener assembly may further include one or more projections extending from a bottomside surface of the lug(s). And, when the fastener body is turned about the longitudinal axis of the stud amid use, the projection(s) can come into alignment with one or more apertures in the workpiece(s). When the nut is tightened over the stud, the projection(s) are received in the aperture(s).

In an embodiment, the adhesive coating resides on the projection(s) before the adhesive coating is cured.

In an embodiment, the adhesive coating resides on surfaces of all of the head, the lug(s), the projection(s), and the nut.

In an embodiment, the fastener assembly is a blind fastener assembly in which access to the fastener assembly at an underside of the workpiece(s) is precluded.

In an embodiment, a method of mounting the fastener assembly to the workpiece(s) may include several steps. One step involves providing the workpiece(s) with the cutout. The cutout resembles the peripheral profile of the head and of the lug(s). The workpiece(s) have the aperture(s). Another step involves inserting the head and the lug(s) through the cutout. Yet another step involves turning the fastener body about the longitudinal axis of the stud until the projection(s) are in-line with the aperture(s). Yet another step involves tightening the nut over the stud. The projection(s) are received in the aperture(s). And another step involves curing the adhesive coating.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Multiple embodiments of a fastener assembly are presented in the figures and described below. The fastener assemblies resolve challenges encountered when used with one or more workpieces composed of lighter weight materials such as aluminum, magnesium, and/or polymer composites, and when the workpiece(s) are part of a partially or wholly enclosed component in which an interior of the enclosed component is largely or entirely inaccessible. The fastener assemblies detailed in this description are hence more efficient and effective in use than previously shown. While the fastener assemblies are described below in the context of automotive components and structures, skilled artisans should appreciate that the fastener assemblies have wide-ranging application and can be employed in other contexts such as aerospace, marine, railway, building construction, home appliance, and industrial equipment applications, among others.

Figure 1:
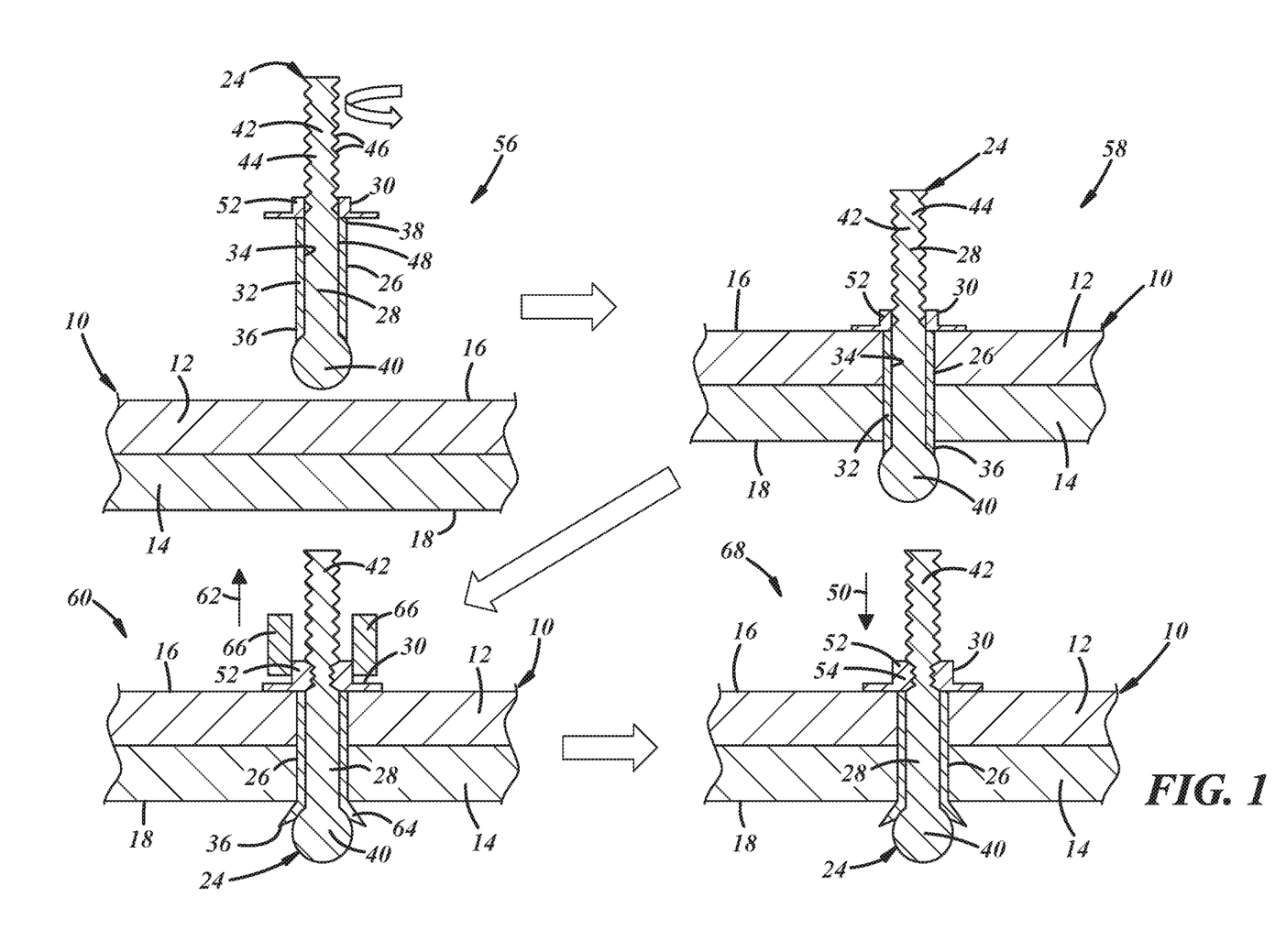
FIG. 1 depicts a first embodiment of a fastener assembly and its use in a method of joining a workpiece stack-up.

The different embodiments of the fastener assemblies can be employed with various workpiece stack-ups and with various workpieces. In FIG. 1, for example, a workpiece stack-up 10 includes a first workpiece 12 and a second workpiece 14 that overlap and overlie each other at a site of installation of a fastener assembly. The workpiece stack-up 10 can be a part of, or itself can constitute, an automotive component or structure such as a truck bed. The first workpiece 12 can be composed of a polymer composite material and hence would be a polymer composite workpiece. In such an example, the first polymer composite workpiece 12 can be composed of different polymer composite materials made of a polymer matrix and a reinforcement bound by the polymer matrix. In a specific example, the first polymer composite workpiece 12 is a carbon fiber composite workpiece of a Nylon 6 plastic with 30 percent (%) by weight of carbon fiber. Similarly, the second workpiece 14 can be composed of a polymer composite material and hence would be a polymer composite workpiece. In such an example, the second polymer composite workpiece 14 can be composed of different polymer composite materials made of a polymer matrix and a reinforcement bound by the polymer matrix. In a specific example, the second polymer composite workpiece 14 is a carbon fiber composite workpiece of a Nylon 6 plastic with 30 percent (%) by weight of carbon fiber.

Still, in other examples, the first and/or second workpieces 12, 14 could be composed of a plastic material with fiber-reinforcements, could be composed of a metal material like an aluminum material or a magnesium material, or could be composed of yet another type and kind of material. Relative to each other, the first and second workpieces 12, 14 can be composed of similar materials or can be composed of dissimilar materials. Whatever material, the workpiece stack-up 10 has a topside with a topside surface 16, and has an underside with an underside surface 18. In an embodiment in which the workpiece stack-up 10 makes up, or is part of, an enclosed component 20 such as a box or tubing (e.g., see FIG. 2) the underside and an interior 22 can be largely or entirely inaccessible for tooling that might otherwise assist with the installation of a fastener assembly. In such an embodiment, the fastener assemblies are referred to as single-sided or blind fastener assemblies. Furthermore, depending on the application, the workpiece stack-up 10 can include more than a pair of workpieces and could include three or four workpieces, for example.

Figure 2:
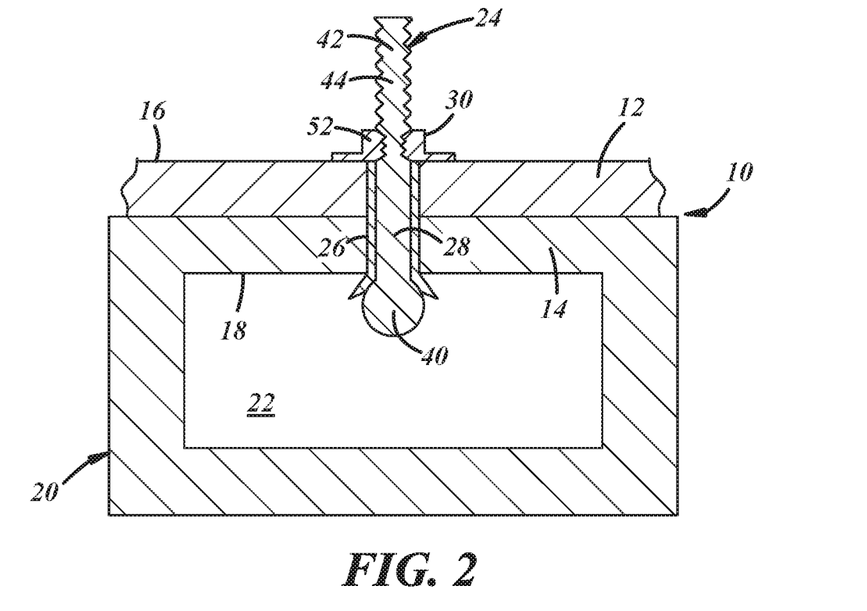
FIG. 2 is a sectional view of the fastener assembly of FIG. 1 in an enclosed structure.

The fastener assemblies presented can have various designs, constructions, and components in different embodiments, depending in part upon their particular purpose of use and upon material compositions of workpieces subjected to their installation, among other possible factors. In the embodiment of FIGS. 1 and 2, for example, a fastener assembly 24 serves to join the first and second workpieces 12, 14 together via a friction stir process, and furnishes the joined workpieces 12, 14 with securement to a distinct component. In an automotive application, the distinct component could be a fluid reservoir, a wire harness, a trim piece, a bracket, or something else; in other applications, the fastener assembly 24 could be used for other purposes apart from securing a distinct component. Furthermore, the fastener assembly 24 can be an originally-installed component of a particular product of manufacture, or can be a retrofitted component where the fastener assembly 24 is utilized for repair and service activities.

With continued reference to FIGS. 1 and 2, in this embodiment the fastener assembly 24 includes a body 26, a mandrel 28, and an interference structure 30. The body 26 has a sleeve 32 that defines a bore 34 within its interior. The bore 34 spans completely through the sleeve 32 between a first open end 36 and a second open end 38. The mandrel 28 is inserted through the sleeve 32 and is disposed in the bore 34 in assembly. Skilled artisans will appreciate that mandrel 28 can be composed of a material exhibiting a hardness that is greater than a hardness of the workpiece(s). The mandrel 28 has a working end 40 and a fastening end 42. The working end 40 projects, and is exposed out of, the first open end 36. The working end 40 is the portion of the fastener assembly 24 that comes into initial contact with the topside surface 16 of the workpiece stack-up 10 amid the friction stir process for softening materials of the first workpiece 12, as described below. The working end 40 can hence have various designs and constructions including, but not limited to, a rounded configuration, a flattened configuration, a cone configuration, or a pointed configuration. Skilled artisans will appreciate that the working end 40 has a greater lateral dimension (in this case, a greater diameter) than that of the sleeve 32. The fastening end 42 projects, and is exposed out of, the second open end 38 both before and after installation of the fastener assembly 24 in the workpiece stack-up 10. The fastening end 42 is the portion of the fastener assembly 24 that is used for securing the distinct component to the workpiece stack-up 10 by way of the fastener assembly 24, whatever that distinct component may be. In the embodiment presented by FIGS. 1 and 2, the fastening end 42 is a stud 44 having a set of external threads 46 for meshing with a complementary set of external threads of the distinct component. In other embodiments, the fastening end 42 could be a nut with a set of internal threads, or could have some other type of design and construction intended to secure a distinct component in a desired way in a given application. In this regard, the fastening end 42 constitutes a projecting extension of the fastener assembly 24 that remains generally exposed and generally accessible at an exterior (in this case, the topside) of the workpiece stack-up 10.

Furthermore, an interconnection 48 between the body 26 and the mandrel 28 is provided in order to unite rotation of the body 26 with rotation of the mandrel 28. In other words, the body 26 and mandrel 28 corotate with each other when the fastener assembly 24 is spun during the friction stir process. The interconnection 48 can have various designs and constructions in different embodiments. In the embodiment of FIGS. 1 and 2, the interconnection 48 is provided in the form of a press-fit between the body 26 and mandrel 28 in which a segment or more of the body 26 and mandrel 28 are mechanically pressed together. Still, in other embodiments, the interconnection 48 and resulting co-rotation can be effected by matching non-circular cross-sections of the body 26 and mandrel 28 (e.g., triangular cross-sections, square cross-sections, and the like); by a deformation formed between the body 26 and mandrel 28 such as by crimping or some other process; and/or by a surface treatment at confronting and opposed surfaces between the body 26 and mandrel 28 such as by knurling, spiral thread rolling, or some other process.

The interference structure 30 fixes inboard movement of the fastener assembly 24 after the fastener assembly 24 is installed in the workpiece stack-up 10. Once established, the interference structure 30 halts movement of the fastener assembly 24 in an inboard direction 50. The interference structure 30 can have various designs, constructions, and components in different embodiments. In the embodiment of FIGS. 1 and 2, the interference structure 30 is provided in the form of a collar 52 situated around the mandrel 28 at an axial location of the fastening end 42 and of the set of external threads 46. Here, the collar 52 is located near the second open end 38 of the sleeve's bore 34 and remains at that location and remains generally exposed at the topside of the workpiece stack-up 10 post-installation. The collar 52, in this embodiment, is a separate component than the body 26 and is a separate component than the mandrel 28, and can be composed of a different material than the body 26 and mandrel 28, though need not be. In an example, the collar 52 is composed of mild steel, but could be composed of other materials in other embodiments. The collar 52 is fixed in place on the mandrel 28 via a swaging process in which a swaged-interference-engagement 54 is forged between an inner section of the collar 52 and threads of the set of external threads 46. Once in place, confrontational abutment between a bottomside surface of the collar 52 and the topside surface 16 of the workpiece stack-up 10 obstructs movement in the inboard direction 50. Still, in other embodiments, the interference structure 30 and resulting precluded movement can be effected in other ways such as by a unitarily-extending portion of the body 26 like a cap or a flange or something else, or by a crimping process carried out on the body 26 at the second open end 38.

With particular reference to FIG. 1, the fastener assembly 24 joins the first and second workpieces 12, 14 together via a friction stir process. The friction stir process can have more, less, and/or different steps and parameters than those described here. In a step 56, the fastener assembly 24 is spun and rotated at a high rate of speed. In a specific example, the fastener assembly 24 is rotated at a speed that ranges between approximately 10,000 and 12,000 revolutions per minute (RPMs); in other examples, the speed can have different RPM ranges. The rotating fastener assembly 24 is brought toward the workpiece stack-up 10 and the working end 40 comes into contact with the first workpiece 12. The high-speed rotation and maintained contact generates frictional heat which softens the local material of the first workpiece 12. In a step 58, the fastener assembly 24 is forcefully urged and driven through the workpiece stack-up 10 and through the first and second workpieces 12, 14. In a step 60, rotation is ceased, and the mandrel 28 is upset into the body 26. The mandrel 28 is forcefully pulled in an outboard direction 62 and the sleeve 32 is deformed partly around the working end 40, as depicted in FIG. 1. An upset deformation 64 hence fixes and halts outboard movement of the fastener assembly 24. Furthermore, the swaging process on the collar 52 can be performed in this step. Swaging dies 66 exert a swaging force against the collar 52 in order to construct the swaged-interference-engagement 54. Lastly, in a step 68, the workpiece stack-up 10 is joined via the fastener assembly 24, and the fastening end 42 is positioned and set for securement with the distinct component.

Figure 3:
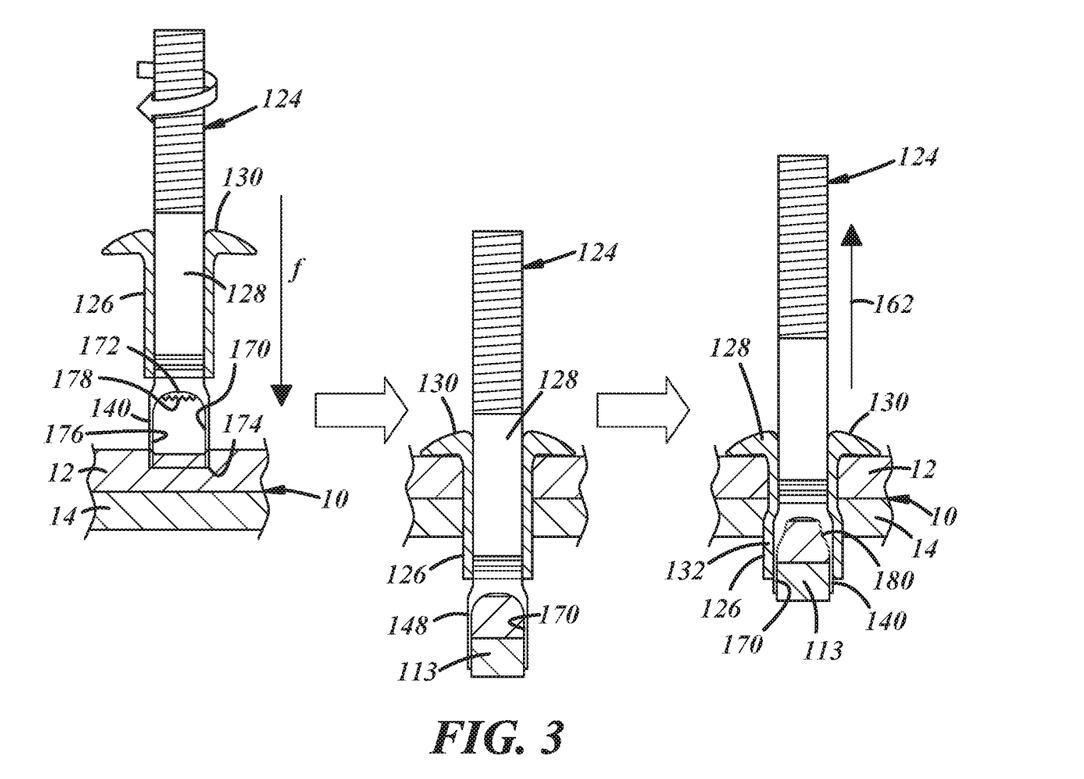
FIG. 3 depicts a second embodiment of a fastener assembly and its use in a method of joining a workpiece stack-up.

During a friction stir process, such as the friction stir process set forth in FIG. 1, it has been found that pieces of material of the workpiece stack-up 10 sometimes have a tendency to develop and be affixed to the underside at the working end 40. In some instances, these pieces of material are dislodged or can otherwise fall therefrom. And in an enclosed component, like the enclosed component 20 of FIG. 2, the fallen pieces of material can bounce around and make rattling noises during use of the larger end product. Referring now to FIG. 3, a second embodiment of a fastener assembly 124 has hence been designed and constructed in view of this drawback. In the second embodiment, components of the fastener assembly 124 are similar to components previously described with reference to FIGS. 1 and 2. Some of these similarities will not be repeated in detail here.

In FIG. 3, the fastener assembly 124 includes a body 126, a mandrel 128, and an interference structure 130. Unlike the previous embodiment, the interference structure 130 is in the form of a flange that is a unitary extension of the body 126. In the second embodiment too, a working end 140 has a different design and construction than that of the previous embodiment. The working end 140 is designed and constructed to capture and retain a slug of material 113 of the workpiece stack-up 10. The working end 140 is hollow and has a cavity 170 defined therein. The cavity 170 spans between a closed end 172 of the working end 140 and an open end 174 of the working end 140. At an inside surface 176, a retention structure 178 can be located for engaging the slug of material 113 during the installation process, and for maintaining its capture post-installation. The retention structure 178 can be in the form of multiple projections extending from the inside surface 176, can be in form of cut threads extending from the inside surface 176, or can have another form.

The friction stir process involving the fastener assembly 124 is similar to that described with reference to FIG. 1. The fastener assembly 124 is rotated at a high rate of speed, the rotating fastener assembly 124 is brought toward the workpiece stack-up 10, and the working end 140 comes into contact with the first workpiece 12. The high-speed rotation and maintained contact generates frictional heat which softens the local material of the first workpiece 12. The fastener assembly 124 is forcefully urged through the workpiece stack-up 10. As the fastener assembly 124 is being driven through the first and second workpieces 12, 14, the slug of material 113 is displaced and removed from the first and second workpieces 12, 14 and is trapped by the working end 140 and captured within the cavity 170. The slug of material 113 can include material of the first workpiece 12, material of the second workpiece 14, or material of both of the first and second workpieces 12, 14. If the retention structure 178 is provided, and depending on its form, the retention structure 178 pierces the slug of material 113 for additional hold. The mandrel 128 is then upset into the body 126. The mandrel 128 is forcefully pulled in an outboard direction 162 and both a sleeve 132 and the mandrel 128 are deformed. In particular, an upset deformation 180 is formed in the mandrel 128 at the working 140 and at the cavity 170. The cavity 170 is deformed inwardly and the inside surface 176 pinches the slug of material 113. The slug of material 113 is therefore further retained within the cavity 170 after the upsetting step is performed. As in the previous embodiment, the upset deformation 180 fixes and halts outboard movement of the fastener assembly 124. The slug of material 113 remains held in the cavity 170 and is precluded from dislodging or otherwise falling therefrom.

Figure 4:
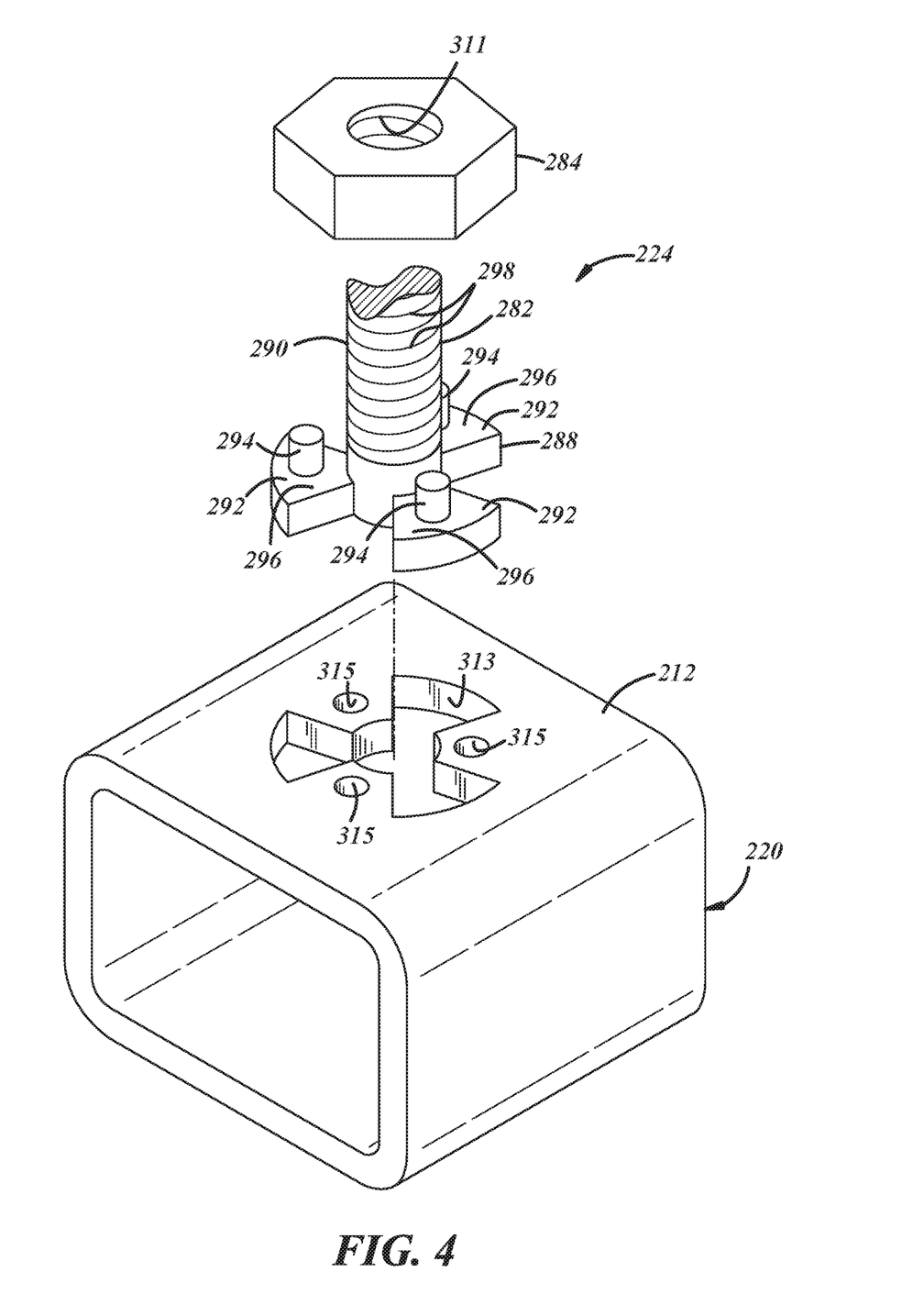
FIG. 4 is an exploded view of a third embodiment of a fastener assembly.
Figure 5:
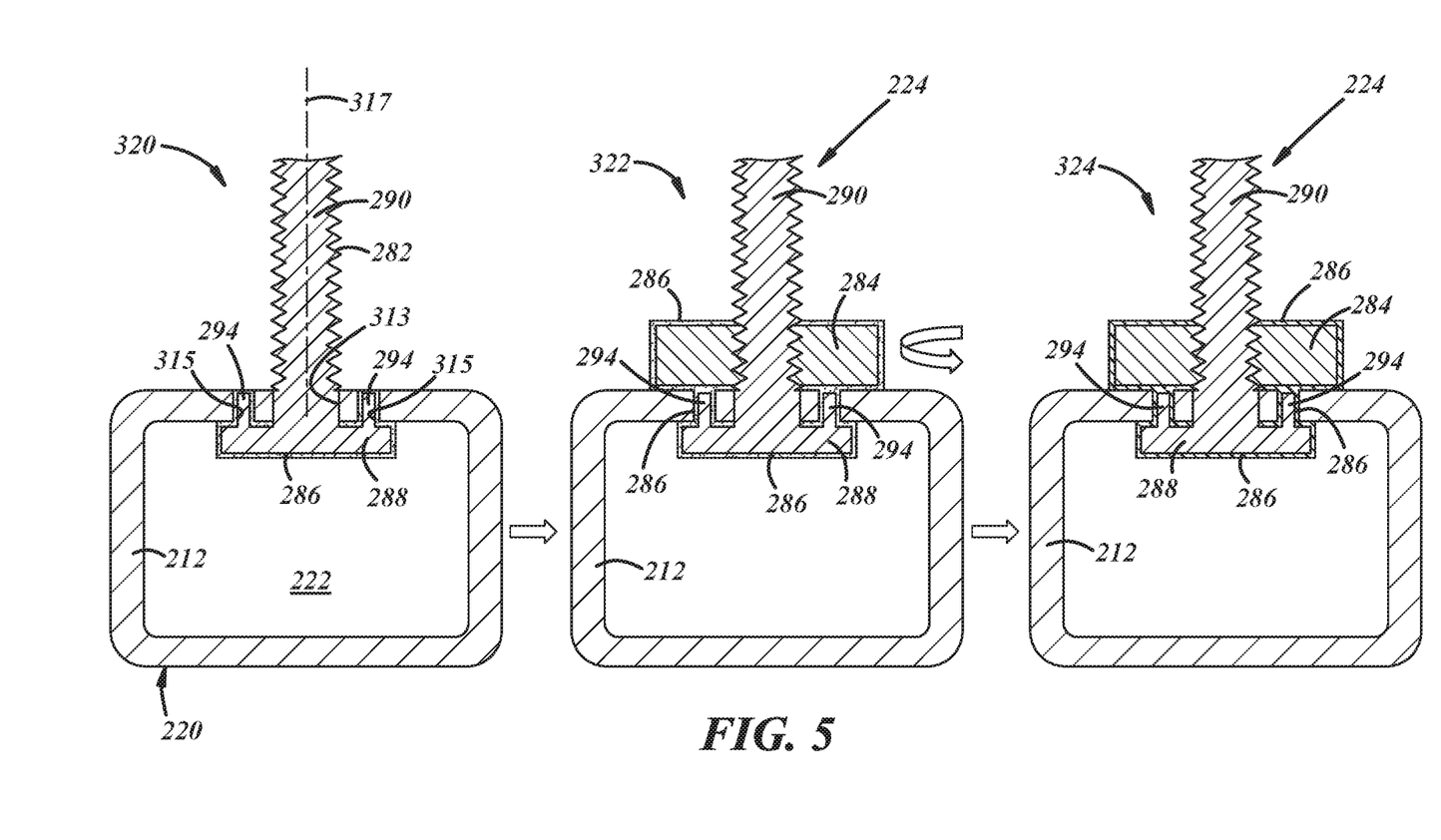
FIG. 5 depicts a method of mounting the fastener assembly of FIG. 4 to an enclosed structure.

Referring now to FIGS. 4 and 5, a third embodiment of a fastener assembly 224 is presented. Some components of the fastener assembly 224 are similar to components described previously with reference to FIGS. 1-3, and some of these similarities will not be repeated here in detail. In FIGS. 4 and 5, the fastener assembly 224 can be mounted to a single polymer composite workpiece 212 that makes up, or is part of, an enclosed component 220. In the third embodiment, the fastener assembly 224 includes a fastener body 282, a nut 284, and an adhesive coating 286. The fastener body 282 has a head 288 and a stud 290. The head 288 can have one or more lugs 292 extending laterally from the head 288—in the embodiment presented in FIGS. 4 and 5, there are a total of three lugs 292 protruding radially and spaced circumferentially around the head 288 (the terms radially and circumferentially being used with respect to the cylindrical configuration of the stud 290). Further, in this embodiment, each lug 292 has a projection 294 protruding longitudinally and axially from a bottomside surface 296 of the respective lug 292. As presented, the projections 294 are cylindrical in shape, but could have other shapes; and each lug 292 has a single projection 294, but one or more lugs 292 could lack a projection 294 or could have more than one projection 294. The stud 290 of the fastener body 282 extends longitudinally and axially from the head 288 and has a set of external threads 298 thereon.

The nut 284 is tightened over the stud 290 and has a set of internal threads 311 for meshing with the set of external threads 298. Furthermore, the adhesive coating 286 can be applied to, and can thus reside on, various surfaces of the fastener assembly 224 in different embodiments. In the embodiment of FIG. 5, for example, the adhesive coating 286 resides on exterior surfaces of all of the head 288, the lugs 292, the projections 294, and the nut 284. In other embodiments, the adhesive coating 286 need not be applied to all of the exterior surfaces set out above, and rather could reside on a single, or a combination, of these exterior surfaces. The adhesive coating 286 can have different compositions in different embodiments, and can be of different adhesive types; indeed, the exact composition and exact type may be dictated by the composition of the polymer composite workpiece 212, among other possible influences. In a specific example, the adhesive coating 286 is a two-part viscous polyurethane-based adhesive.

The fastener assembly 224 is mounted to the polymer composite workpiece 212 in order to furnish the workpiece 212 with securement to a distinct component. To carry out the mounting process in the embodiment of FIGS. 4 and 5, the polymer composite workpiece 212 has a cutout 313 and has three apertures 315 defined therein. As shown best in FIG. 4, the cutout 313 is shaped to complement and resemble the peripheral profile of the head 288 and its lugs 292, and the apertures 315 are similarly shaped and arranged to complement and resemble the cylindrical profile and arrangement of the projections 294. The cutout 313 and apertures 315 can span completely through the polymer composite workpiece 212.

In the embodiment presented by FIGS. 4 and 5, a method of mounting the fastener assembly 224 to the polymer composite workpiece 212 has several steps. Still, the method can have more, less, and/or different steps than those described here in other embodiments. In an initial step, the adhesive coating 286 is applied to the exterior surfaces of the head 288, the lugs 292, the projections 294, and the nut 284. As demonstrated in FIG. 4, the fastener body 282 can then be inserted partway through the cutout 313. The head 288 and lugs 292 are received through the matching shape of the cutout 313 and are temporarily suspended within an interior 222 of the polymer composite workpiece 212. The fastener body 282 is then turned and rotated about a longitudinal axis 317 of the stud 290. The fastener body 282 can be turned clockwise or counterclockwise until each of the projections 294 is aligned, and in-line, with a respective aperture 315. Referring now particularly to FIG. 5, in a step 320, the fastener body 282 is pulled in the outboard direction, and the projections 294 are received in the apertures 315. Due to the projection/aperture insertion, the fastener body 282 is halted from farther clockwise and counterclockwise rotation. In a step 322, the nut 284 is tightened over the stud 290 and the projections 294 can be brought into yet closer receipt in the apertures 315. And in a step 324, the adhesive coating 286 is cured to a fully-cured state of hardening. The curing technique carried out to effect the fully-cured state can vary in different embodiments and is often dependent upon the composition and type of the adhesive coating 286. In the example of the adhesive coating 286 being a two-part viscous polyurethane-based adhesive, the curing technique carried out can involve heating (e.g., induction heating, convective heating, contact heating, or another type of heating), cooling in ambient conditions, or a combination of heating and cooling.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A fastener assembly for joining a workpiece stack-up, the fastener assembly comprising:
   a body having a sleeve and a bore spanning through the sleeve;
   a mandrel disposed in the bore, the mandrel having a working end and a fastening end, the working end projecting out of a first open end of the bore and the fastening end projecting out of a second open end of the bore, the fastening end for securement with a distinct component;
   an interconnection between the body and the mandrel, the interconnection uniting rotation of the body with rotation of the mandrel; and
   an interference structure residing adjacent the second open end of the bore, wherein the interference structure is a collar situated on the mandrel at the fastening end and the collar has a swaged-interference engagement with the mandrel at the fastening end,
   wherein, during use of the fastener assembly, the working end of the mandrel is used to soften the materials of the workpiece stack-up via friction generation as the fastener assembly is being urged through the workpiece stack-up, and wherein, in installation of the fastener assembly in the workpiece stack-up, a section of the sleeve and of the working end are exposed at an underside of the workpiece stack-up with the working end upset into the sleeve to thereby fix outboard movement of the fastener assembly at the underside of the workpiece stack-up, the fastening end remains exposed at a topside of the workpiece stack-up with the interference structure at least partly exposed at the topside, the swaged-interference engagement of the interference structure fixing inboard movement of the fastener assembly at the topside of the workpiece stack-up.

2. The fastener assembly as set forth in claim 1, wherein the fastening end is a stud having a set of external threads for securement with the distinct component, or the fastening end is a nut having a set of internal threads for securement with the distinct component.

3. The fastener assembly as set forth in claim 1, wherein the collar is a separate component than the body and is a separate component than the mandrel.

4. The fastener assembly as set forth in claim 1, wherein the fastening end is a stud having a set of external threads, the swaged-interference engagement of the collar being had with the set of external threads of the stud.

5. The fastener assembly as set forth in claim 1, wherein the working end has a cavity and wherein, during use of the fastener assembly, the cavity is used to capture a slug of material of the workpiece stack-up that is displaced from the workpiece stack-up amid installation procedures of the fastener assembly in the workpiece stack-up.

6. The fastener assembly as set forth in claim 5, wherein the slug of material of the workpiece stack-up remains captured within the cavity of the working end when the working end is upset into the sleeve.

7. The fastener assembly as set forth in claim 1, wherein the fastener assembly is a blind fastener assembly in which access to the fastener assembly at the underside of the workpiece stack-up is precluded.

8. A fastener assembly for joining a workpiece stack-up, the fastener assembly comprising:
   a body having a sleeve and a bore spanning through the sleeve;
   a mandrel disposed in the bore and having a working end and a fastening end, the working end projecting out of an open end of the bore and having a cavity therein; and
   a collar situated on the mandrel at the fastening end and wherein the collar has a swaged-interference engagement with the mandrel at the fastening end,
   wherein, during use of the fastener assembly, the working end of the mandrel is used to soften the materials of the workpiece stack-up via friction generation, the cavity is used to capture a slug of material of the workpiece stack-up that is displaced from the workpiece stack-up as the fastener assembly is being urged through the workpiece stack-up, and wherein, in installation of the fastener assembly in the workpiece stack-up, a section of the sleeve and of the working end are exposed at an underside of the workpiece stack-up with the working end upset into the sleeve to thereby fix outboard movement of the fastener assembly at the underside of the workpiece stack-up and the swaged-interference engagement of the collar fixes inboard movement of the fastener assembly at the topside of the workpiece stack-up.

9. The fastener assembly as set forth in claim 8, wherein the slug of material of the workpiece stack-up remains captured within the cavity of the working end when the working end is upset into the sleeve.

10. The fastener assembly as set forth in claim 8, wherein the working end has a closed end and an open end, the cavity spanning between the closed end and the open end, the open end constituting the inboard-most-extending end of the working end that comes into initial contact with a topside surface of the workpiece stack-up as the fastener assembly is being urged through the workpiece stack-up.

11. The fastener assembly as set forth in claim 8, wherein the cavity is defined at least in part by an inside surface of the working end, a retention structure residing at the inside surface, the retention structure engaging the slug of material of the workpiece stack-up and retaining capture of the slug of material within the cavity.

12. The fastener assembly as set forth in claim 8, wherein the fastener assembly is a blind fastener assembly in which access to the fastener assembly at the underside of the workpiece stack-up is precluded.

* * * * *